United States Patent [19]

Luke et al.

[11] 4,204,245

[45] May 20, 1980

[54] FRONT TRIM FOR PANELBOARD

[75] Inventors: Roger D. Luke, Norcross; John M. Rhodes, Atlanta, both of Ga.

[73] Assignee: Gould Inc., Rolling Meadows, Ill.

[21] Appl. No.: 945,890

[22] Filed: Sep. 26, 1978

[51] Int. Cl.² .............................................. H02B 1/04
[52] U.S. Cl. .................... 361/358; 361/359; 361/363; 220/266; 174/66
[58] Field of Search ................. 220/3, 7, 266; 174/57, 174/66, 65 R; 49/400, 401, 402, 465; 361/334, 356, 358, 359, 361, 363

[56] References Cited

U.S. PATENT DOCUMENTS

| | | | |
|---|---|---|---|
| 1,782,019 | 11/1930 | Wheeler | 361/359 |
| 2,511,995 | 6/1950 | Robertson | 361/359 |
| 3,166,633 | 1/1965 | Guzan, Jr. et al. | 174/66 |
| 3,202,881 | 8/1965 | Carlyle | 361/358 |
| 3,349,292 | 10/1967 | Meacham | 361/363 |
| 3,356,907 | 12/1967 | Bragulat | 361/359 |
| 3,532,938 | 10/1970 | Holman et al. | 361/359 |
| 3,873,759 | 3/1975 | Schindler | 220/266 |

Primary Examiner—Gerald P. Tolin
Attorney, Agent, or Firm—Ostrolenk, Faber, Gerb & Soffen

[57] ABSTRACT

The front trim of a panelboard consists of a front plate having an interior opening surrounded by a rearwardly extending lip, and a face plate having a forwardly extending lip disposed in telescoping relationship with respect to the lip of the front plate. Adjusting means are provided to move the face plate forward and rearward while the front plate and the panelboard interior remain stationary. The face plate is provided with twist-outs which are pressed forward so that during removal thereof they cannot be punched to the rear into engagement with live conductors of the panelboard interior.

8 Claims, 7 Drawing Figures

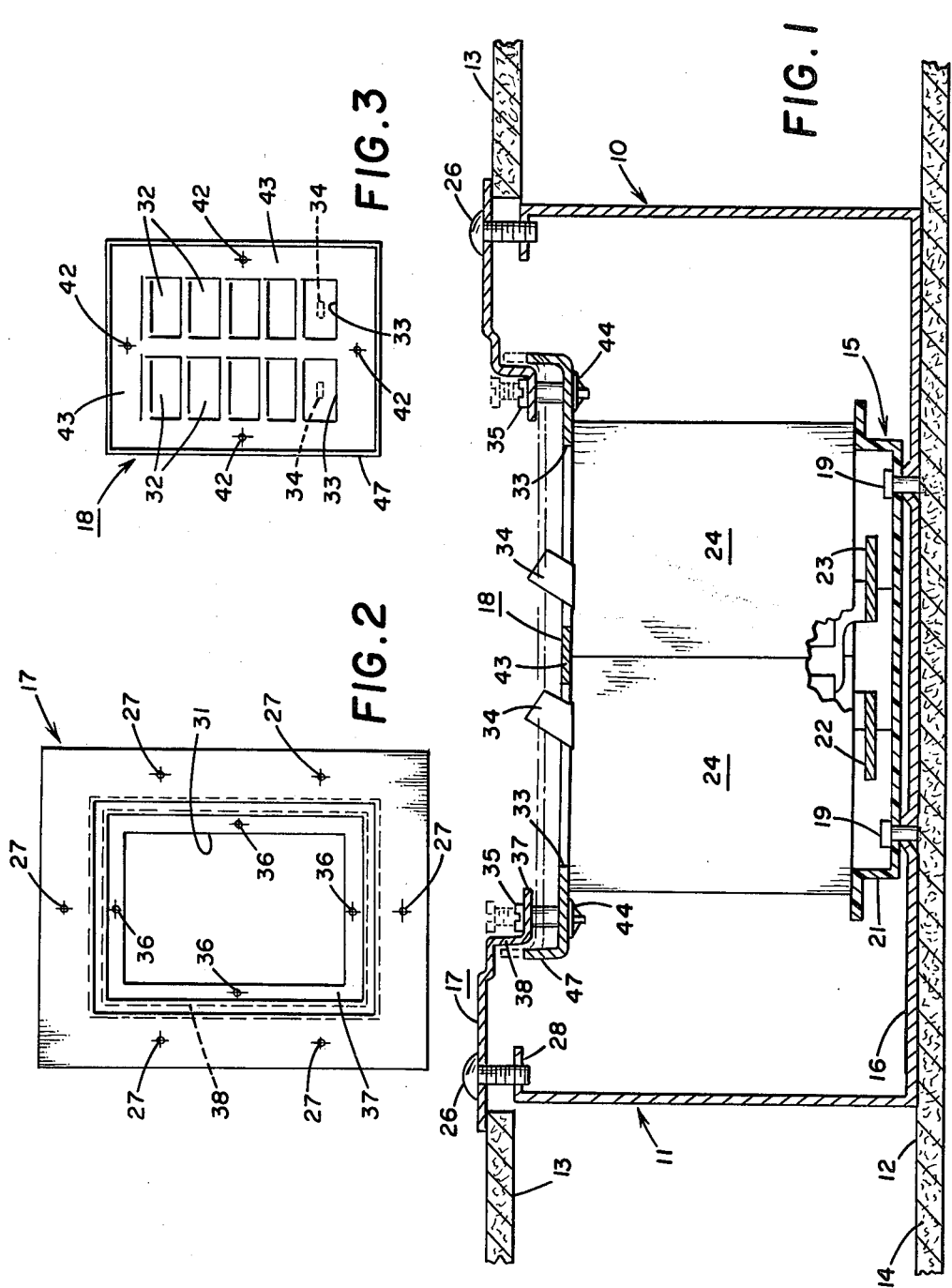

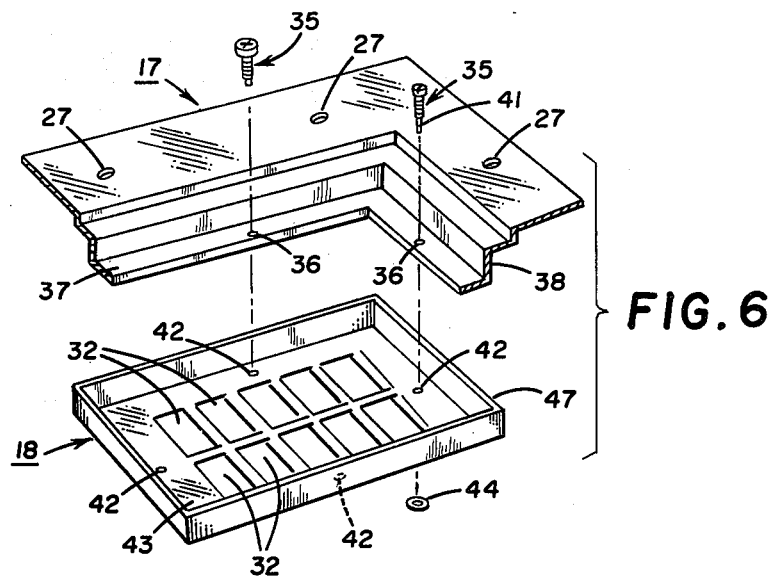
FIG. 6
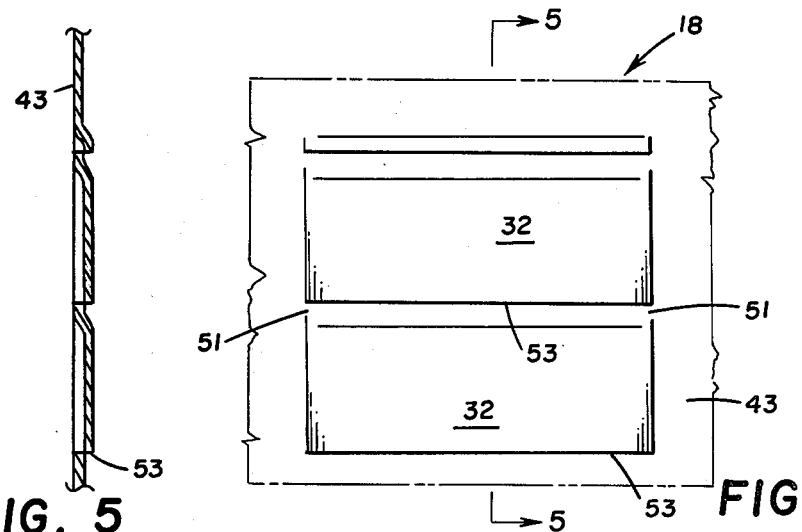
FIG. 5
FIG. 4
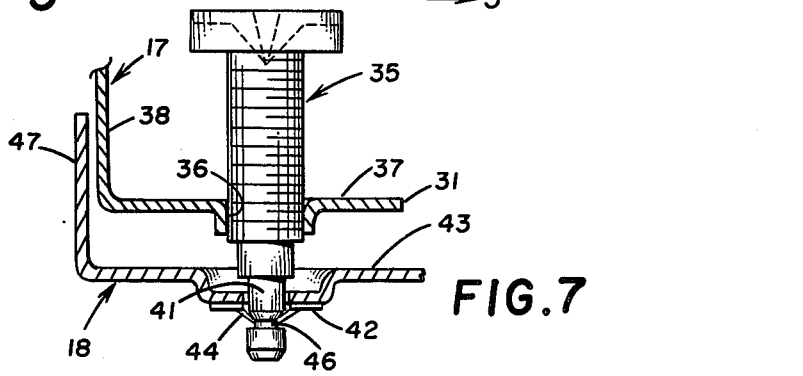
FIG. 7

FRONT TRIM FOR PANELBOARD

This invention relates to electrical panelboards in general and more particularly relates to construction of the front trim thereof.

Very often panelboards for domestic and light industrial applications are mounted so that the front of the panelboard enclosure is behind the front surface of the wall on which the panelboard is mounted. Since walls vary in thickness the space between the rear of the enclosure and the front trim for the panelboard varies from installation to installation. This has resulted in installation problems, particularly in locating the face plate of the front trim in relation to the panelboard interior having the electrical conductors to which the panelboard circuit breakers are connected.

Typically, the panelboard interior must be moved in or out in varying degrees to compensate for different wall thicknesses. These adjustments are made prior to installation of the front trim, being done in steps as a series of approximations, until a good fit is obtained. Since this requires adjustment of the panelboard interior many electrical conductors must be bent. This often imposes severe mechanical loads on the screws or other adjusting means.

Another prior art approach to compensate for different wall thicknesses is described in U.S. Pat. No. 2,261,987, issued Nov. 11, 1941, to W. H. Frank et al for a Panelboard. In U.S. Pat. No. 2,261,987 the panelbaord is spring mounted so as to biased in a forward direction. When the front trim is mounted the face plate thereof engages the panelboard circuit breakers, forcing the panelboard interior rearward to the extent required. While this type of construction may be satisfactory for small panelboards of low current capacity, with panelboards of high current capacity having many large conductors which must be bent simultaneously, eccessive mechanical stresses will be built up.

The instant invention overcomes the aforesaid disadvantages of the prior art by providing a panelboard construction in which the front trim consists of a fixed front plate which is mounted against the front of the wall to which the panelboard is mounted, and a face plate which is mounted to the front plate so as to be adjustable with respect thereto by way of movement toward or away from the rear of the panelboard enclosure as required to be operatively positioned with respect to the panelboard circuit breakers. With this arrangement there is no need to adjust the panelboard interior thereby eliminating the necessity for utilizing very rigid material to construct the base pan of the interior. Instead, the interior is fixedly connected to the enclosure in a manner such that the rigidity of the enclosure is imparted to the interior.

Another problem which arises in connection with prior art panelboards is that the face plates thereof are usually provided with twist-outs which are removed as required to provide apertures through which the circuit breaker operating handles extend. Unfortunately, through carelessness or otherwise these twist-outs are often pushed towards energized conductors of the panelboard interior causing serious injuries to personnel and/or damage to the panelboard conductors. The instant invention solves this problem by providing twist-outs that are formed by forwardly pressing the sections of the face plate in a manner such that removal of the twist-out requires prying or pressing in a forward direction, or the direction away from the energized conductors of the panelbaord.

Accordingly, a primary object of the instant invention is to provide a novel construction for a panelboard to simplify installation thereof.

Another object is to provide a panelbaord of this type having a novel front trim constructed so that there is no need to move the panelboard interior with respect to the panelboard enclosure during installation of the panelboard.

A further object is to provide a panelboard of this type in which the twist-outs of the face plate are pressed in a forward direction so that they will not accidentally be punched inward to engage energized conductors of the panelboard.

These objects as well as other objects of this invention shall become readily apparent after reading the following description of the accompanying drawings in which:

FIG. 1 is a transverse cross-section of a panelboard including front trim means constructed in accordance with teachings of the instant invention.

FIG. 2 is a front elevation of the front plate of the front trim means.

FIG. 3 is a front elevation of the face plate of the front trim means.

FIG. 4 is an enlarged fragmentary portion of the face plate of FIG. 3.

FIG. 5 is a cross-section taken through line 5—5 of FIG. 4 looking in the direction of arrows 5—5.

FIG. 6 is a fragmentary exploded perspective of a front trim means.

FIG. 7 is a detail showing mounting of one of the screws for adjusting the position of the face plate relative to the front plate of the front trim.

Now referring to the Figures. Panelboard 10 of FIG. 1 includes rectangular enclosure 11 having its rear wall resting against mounting surface 12 so that enclosure 11 is disposed within the wall defined by spaced parallel sheets of dry wall or plasterboard 13, 14. Panelboard interior 15, of the general type described in our copending application Ser. No. 920,153 filed June 29, 1978 for an Electric Distribution Panel Having Extruded Base, includes relatively shallow base pan 21 ad main bus bars 22, 23 for energizing a plurality of plug-in type circuit breakers 24. A plurality of fasteners 19 fixedly secured interor 15 to the front of the enclosure rear walls 16.

The open front of enclosure 11 is covered by a trim means consisting of front plate 17 (FIG. 2) and face plate 18 (FIG. 3). As seen in FIG. 1, the front of enclosure 11 is disposed behind the front surface of plaster board 13. The periphery of front plate 17 extends beyond the side edges of enclosure 11 and rests against the front surface of plaster baord 13. A plurality of machine screws 26 extending through clearance apertures 27 in face plate 17 are received by threaded apertures in the inwardly turned lip 28 at the front of enclosure 11 to secure trim means 17, 18 in operative position.

Face plate 17 is provided with large rectangular interior opening 31 positioned in general alignment with the open front of enclosure 11. The latter opening is larger than opening 31. Face plate 18 is disposed behind front plate 17, covering opening 31. In a manner well known to the art, face plate 18 is provided with a plurality of sections 32 which are removable individually to provide openings 33 through which the operating handles 34 of circuit breakers 24 extend.

Four screws 35 adjustably mount face plate 18 to the rear of front plate 17. As best seen in FIGS. 2, 3 and 7, each adjusting screw 35 is threadably mounted in an individual aperture 36 of front plate 17. Aperture 36 is in the narrow inwardly extending margin 37 along the rear edge of rearwardly extending lip 38 which surrounds front plate opening 31. The rear non-threaded free end 41 of adjusting screw 35 is rotatably guided in clearance aperture 42 of face plate main section 43, being held therein by spring retainer 44 which is disposed within annular groove 46 of adjusting screw section 41. The periphery of face plate main section 43 is provided with forwardly extending lip 47 which is in telescoping relationship with rearwardly extending lip 38 of the front plate 17. That is, lip 47 is in closely spaced relationship with respect to lip 38 being outboard of the latter, and when face plate 18 is adjusted there is a greater or lessor overlapping relationship between lips 38, 47.

The adjusting movement of face plate 18 is required in order bring main section 43 thereof adjacent the front of the housings for circuit breakers 24. It should be apparent that this adjustment takes place by rotating the four adjusting screws 35 whose axes extend in a front to rear direction so that rotation of screws 35 will move the free end portions 41 thereof toward or away from interior 15. This movement of free end portions 41 moves face plate 18 forward or rearward as the case may be. It is noted that this adjusting movement of face plate 18 takes place without moving panelboard interior 15 and/or enclosure 11, and/or front plate 17.

While the provision of twist-out means for the front trim of a panelboard is commonplace, the prior art twist-out sections have been constructed so that by intent or accident, they can readily be forced rearwardly and contact energized elements, such as bus bars 22, 23, of panelboard interior 15. To overcome this condition, the instant invention provides rectangular twist-out sections 32 which, as seen best in FIG. 5, are in normal positions pressed forward of main section 43, except at sections 51, 51 connecting twist-out 32 to main section 43. Thus, a rearwardly directed force of reasonable magnitude will be ineffective to break twist-out 32 away from main section 43. Instead, a prying tool must be inserted along the cut edge 53 of twist-out 32 remote from connecting sections 51, 51. This will bend twist-out 32 forward. Thereafter, an oscillating twisting motion applied to twist-out 32 will sever the latter from main section 43.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. An electrical panelboard including a rectangular enclosure having an open front and having a front to back dimension, or depth, which is substantially less than either the length or width of said enclosure; interior means having circuit protection energizing elements; said interior means mounted within said enclosure; closure means at the front of said enclosure; said closure means including a front plate having an interior opening smaller than the open front of the enclosure and in general alignment with said open front; said closure means also including a face plate having opening means for handles of circuit breakers, mounted to said panelboard and connected with said energizing elements, to extend through; and first means accessible for operation at the front of said front plate for front to rear adjustment of said face plate while said enclosure, said interior means and said front plate remain in fixed positions; said front plate being provided with rearward extending first lip means surrounding said interior opening and said face plate being provided with forwardly extending second lip means outboard of said opening means and disposed in telescoping relationship with said first lip means; said first lip means being inboard of the second lip means; said front plate also being provided with a narrow marginal portion extending inward from the rear edge of the first lip means; said first means being secured to said marginal portion.

2. An electrical panelboard as set forth in claim 1 in which the front plate extends beyond the sides of the enclosure.

3. An electrical panelboard as set forth in claim 1 in which the face plate includes a main section; said opening means formed by a plurality of removable forwardly pressed twist-outs formed integrally with said main section; said twist-outs being proportioned so as to be detachable from said main section only by being forced forward.

4. An electrical panelboard as set forth in claim 3 in which each of said twist-outs is rectangular and is joined to the main section by connecting portions at opposite ends of one side of the twist-out in question.

5. An electrical panelboard as set forth in claim 4 in which each of the twist-outs is generally in a plane parallel to the plane of main section and stepped forward by approximately the thickness of the main section.

6. An electrical panelboard as set forth in claim 1 in which the first means includes a plurality of screws having threaded portions thereof extending to the rear of said marginal portion.

7. An electrical panelboard as set forth in claim 6 in which said face plate is secured to said screws in fixed position lengthwise thereof; said screws extending through threaded apertures in said marginal portion in operative engagement therewith.

8. An electrical panelboard as set forth in claim 1 in which the first lip means and the marginal portion are formed integrally with the front plate.

* * * * *